US 7,779,971 B2

(12) United States Patent
Adachi

(10) Patent No.: US 7,779,971 B2
(45) Date of Patent: Aug. 24, 2010

(54) VEHICULAR DISK BRAKE

(75) Inventor: Osamu Adachi, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 292 days.

(21) Appl. No.: 11/684,418

(22) Filed: Mar. 9, 2007

(65) Prior Publication Data
US 2007/0209888 A1    Sep. 13, 2007

(30) Foreign Application Priority Data
Mar. 13, 2006 (JP) .......................... P.2006-068268

(51) Int. Cl.
F16D 55/08 (2006.01)
(52) U.S. Cl. ................. 188/72.1; 188/71.9; 188/158; 188/162; 475/149; 475/163; 475/175
(58) Field of Classification Search ........... 188/72.7, 188/162, 158, 196 R, 71.8, 71.9, 72.1, 72.3; 475/149, 154, 163, 175
See application file for complete search history.

(56) References Cited

U.S. PATENT DOCUMENTS

| 5,123,505 | A | * | 6/1992 | Antony ................. 188/71.9 |
| 5,123,883 | A | | 6/1992 | Fukaya |
| 6,138,801 | A | * | 10/2000 | Shirai et al. ............. 188/157 |
| 6,491,140 | B2 | * | 12/2002 | Usui et al. .............. 188/72.1 |
| 6,880,680 | B2 | | 4/2005 | Watanabe et al. |
| 6,959,791 | B2 | * | 11/2005 | Usui ..................... 188/72.1 |
| 2001/0023798 | A1 | | 9/2001 | Usui et al. |
| 2004/0195058 | A1 | * | 10/2004 | Ina et al. ................ 188/158 |

FOREIGN PATENT DOCUMENTS

| DE | 19618248 | 10/1997 |
| EP | 0444790 | 9/1991 |
| JP | 55057743 | 4/1980 |
| JP | 2001-032868 | 2/2001 |
| JP | 2001263395 | 9/2001 |
| JP | A2001263395 | 9/2001 |
| JP | 2002-115748 | 4/2002 |
| JP | 2005-539189 | 12/2005 |

OTHER PUBLICATIONS

European Search Report for EP 07005034.9-1252.
Decision of Refusal for corresponding Japanese Application No. 2006-068268.
Office Action dated Oct. 6, 2009 for corresponding Japanese Application No. 2006-068268.

* cited by examiner

Primary Examiner—Robert A Siconolfi
Assistant Examiner—Mariano Sy
(74) Attorney, Agent, or Firm—Roberts Mlotkowski Safran & Cole, P.C.

(57) ABSTRACT

A speed reducer 32 has an eccentric rotating member 56 which rotates along with a motor shaft 55 of an electric motor 11, an outer gear 57 which is rotatably supported by the outer circumference of the eccentric rotating member 56, an inner gear 58 which is fixedly disposed so as to be coaxial with the motor shaft 55 so as to engage with the outer gear 57, an output member 59 which is connected to an input member 37 of the motion converting mechanism 22 disposed so as to be coaxial with the motor shaft 55 so as to be not relatively rotatable about the input member 37, and an Oldham mechanism 60 which is disposed between the outer gear 57 and the output member 59 so as to transmit only a rotational component of the outer gear 57.

16 Claims, 6 Drawing Sheets

US 7,779,971 B2

VEHICULAR DISK BRAKE

BACKGROUND OF THE INVENTION

1. Field of the Invention

The present invention relates to a vehicular disc brake having a caliper body that supports a brake piston so as to be axially slidably and has an electric motor, a speed reducer that reduces output from the electric motor, a motion converting mechanism that converts a rotation output from the speed reducer into axial operation force of the brake piston and is interposed between the brake piston and the speed reducer.

2. Description of Related Art

It is know in Japanese Patent Unexamined Publication JP-A-2001-263395 that vehicular disc brake having a motion converting mechanism that is disposed between a speed reducer for reducing power output from a motor shaft of an electric motor and a brake piston, and has axis line eccentric with the motor shaft In the vehicular disc brake, the speed reducer includes a pair of inner gears disposed in a pair of rotating members of the motion converting mechanism or the motor shaft; and a pair of outer gears disposed in the other of the pair of rotating members or the motor shaft so as to engage with the inner gears.

However, in the vehicular disc brake disclosed in JP-A-2001-263395, a ball bearing is interposed between the outer circumference of at least one of the pair of inner gears of the speed reducer and a casing for housing the speed reducer. Thus, a space for the ball bearing is required in outside the inner gears in the radius direction, thereby causing an increase in size of the speed reducer.

SUMMARY OF THE INVENTION

The invention is contrived to solve the above-mentioned problem. An object of the invention is to provide a vehicular disc brake with a compacted speed reducer.

In order to achieve the above-mentioned object, according to a first aspect of the invention, there is provided a vehicular disc brake comprising a caliper body supporting a brake piston so as to be slidable in an axial direction of the brake piston, the caliper body comprising:

an electric motor having a motor shaft;

a speed reducer that reduces output from the electric motor and has a case;

a motion converting mechanism that converts a rotation output from the speed reducer into axial operation force of the brake piston, is interposed between the brake piston and the speed reducer and has an input member disposed so as to be coaxial with the motor shaft, wherein the speed reducer comprises:

an eccentric rotating member which has an outer circumference being eccentric with the motor shaft and rotates together with the motor shaft;

an outer gear which is coaxial with the eccentric rotating member and is rotatably supported by the outer circumference of the eccentric rotating member, and provided with outer teeth on an outer circumference thereof;

an inner gear that is provided with inner teeth, of which number is larger than that of the outer teeth, on an inner circumference thereof so as to engage with the outer teeth and is fixedly disposed within the case of the speed reducer so as to be coaxial with the motor shaft;

an output member which is connected to the input member of the motion converting mechanism so as to be not relatively rotatable about the input member; and an Oldham mechanism which is disposed between the outer gear and the output member so as to transmit only a rotational component of the outer gear.

According to a second aspect of the invention, as set forth in the first aspect of the invention, it is preferable that the Oldham mechanism comprises:

a plurality of pins which are disposed in the outer gear at regular intervals in a circumferential direction of a first virtual circle SC1 of which center is an axis line of the outer gear; and a plurality of connection holes which are disposed in the output member at regular intervals in a circumferential direction of a second virtual circle SC2 of which center is an axis line of the motor shaft, wherein the connection hole has a diameter larger than diameter of the pins, and allows the pins to penetrate therethrough to locate the pins in eccentric positions relative to the connection holes, respectively.

A screw mechanism 22 of an embodiment corresponds to the motion converting mechanism of the invention and an transmitting rotation shaft 37 of the embodiment corresponds to the input member of the invention.

According to the first aspect of the invention, the outer gear rotates at a reduction ratio corresponding to a difference between the number of inner teeth of the inner gear and the number of outer teeth of the outer gear in accordance with the rotation of the eccentric rotating member resulting form rotation of the electric motor. The rotational component of the outer gear is input to the motion converting mechanism through the Oldham mechanism, thereby driving the brake piston in the axial direction. Since the inner gear of the speed reducer is fixedly disposed and it is not necessary to secure a space for a ball bearing outside the inner gear in the radius direction, it is possible to compact the speed reducer.

According to the second aspect of the invention, it is possible to simplify the configuration of the Oldham mechanism, enhance assembling workability, and to prevent a wobbling of a shaft.

DETAILED DESCRIPTION OF EXEMPLARY EMBODIMENTS OF THE INVENTION EMBODIMENTS

Hereinafter, an embodiment of the invention will be described with reference to the accompanying drawings.

Figure 1:
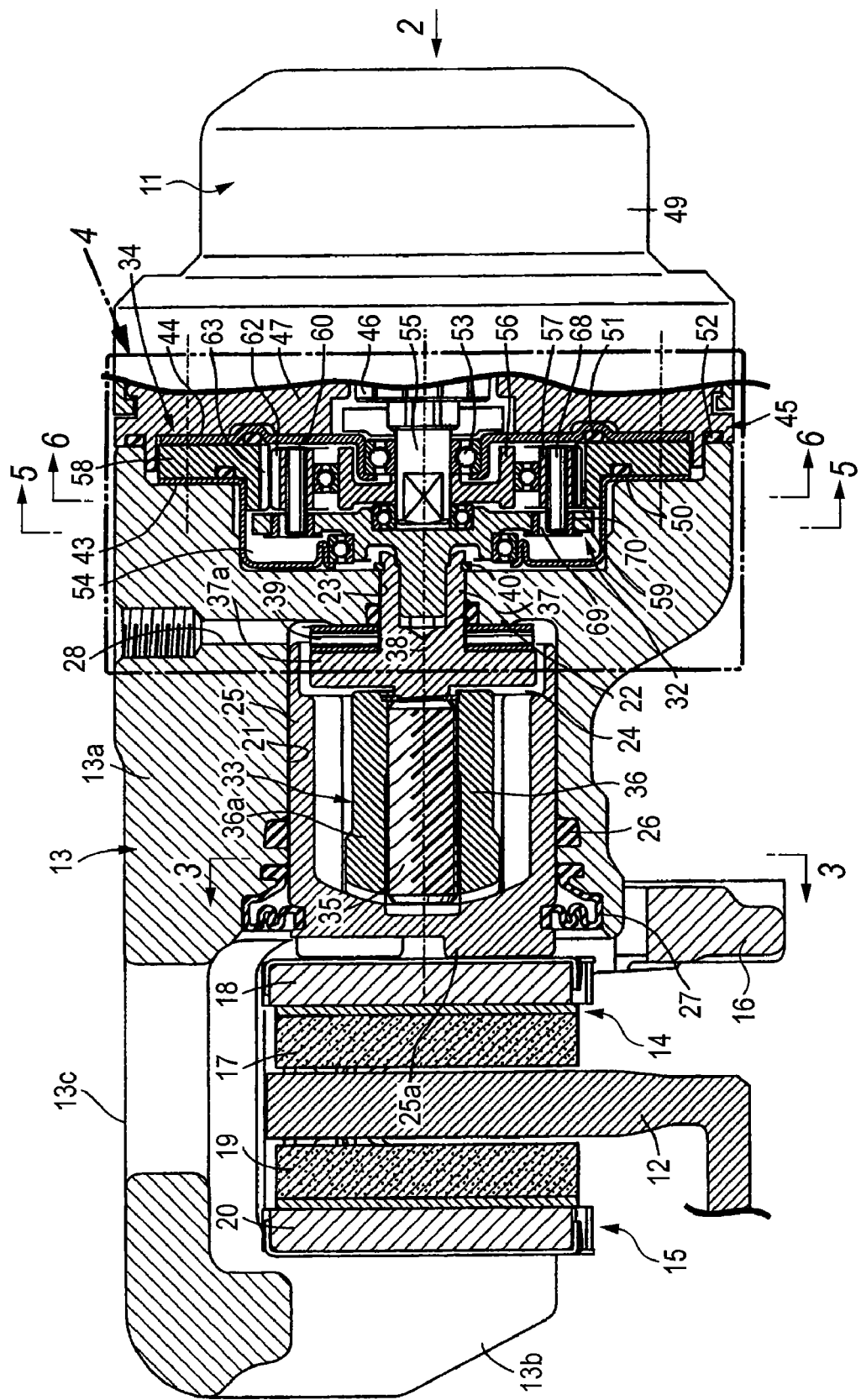
FIG. 1 is a longitudinal section view of a vehicular disc brake.
Figure 2:
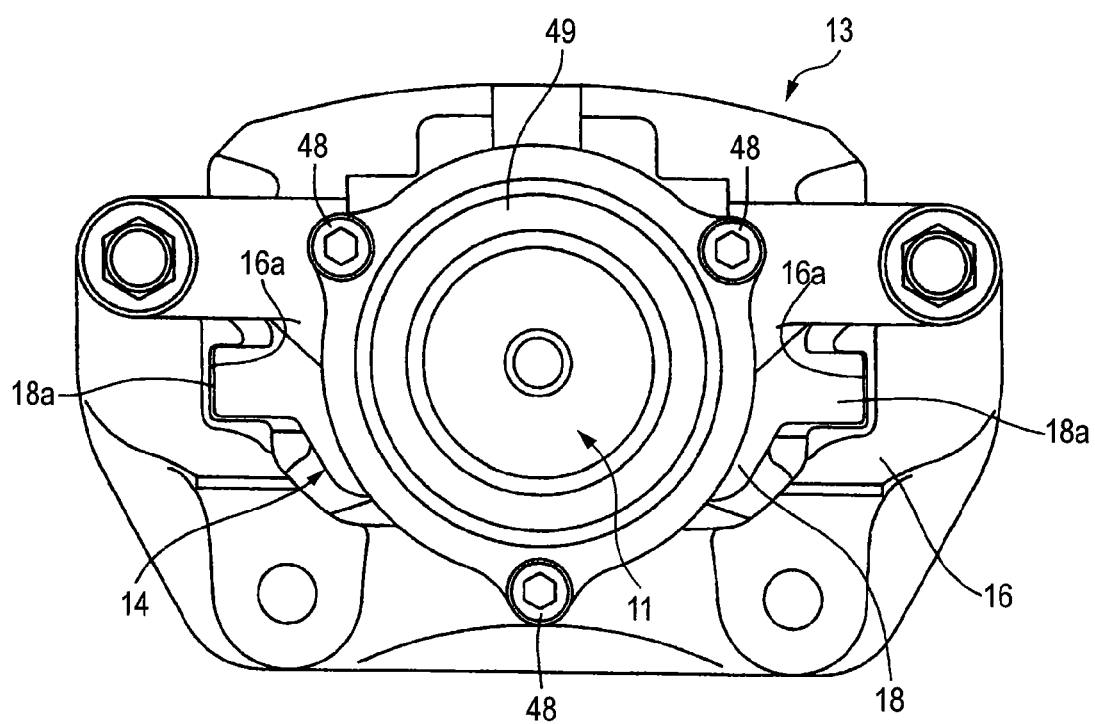
FIG. 2 is a diagram as viewed in a direction of arrow 2 of FIG. 1.
Figure 3:
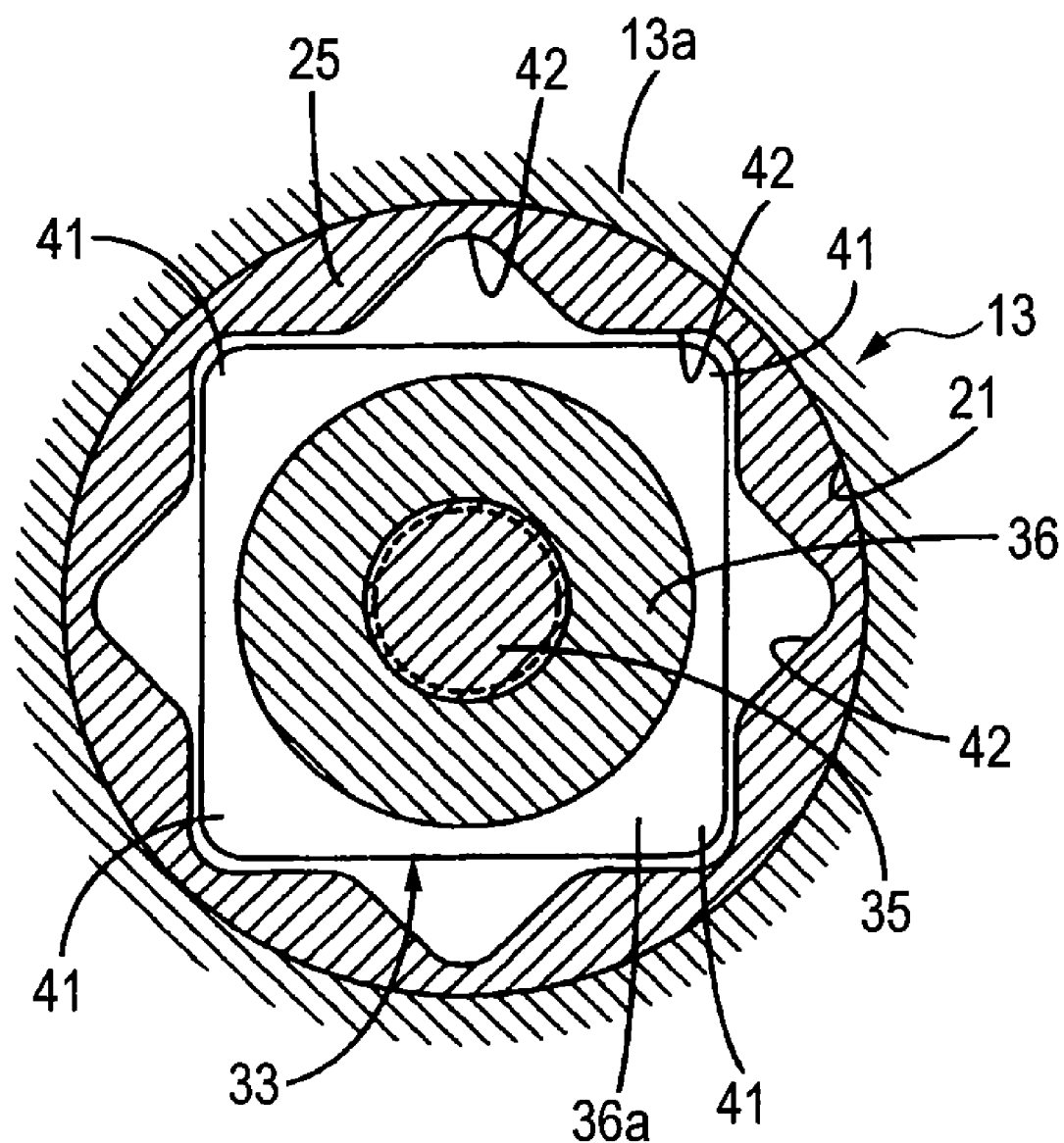
FIG. 3 is a cross-sectional view taken along line 3-3 of FIG. 1.
Figure 4:
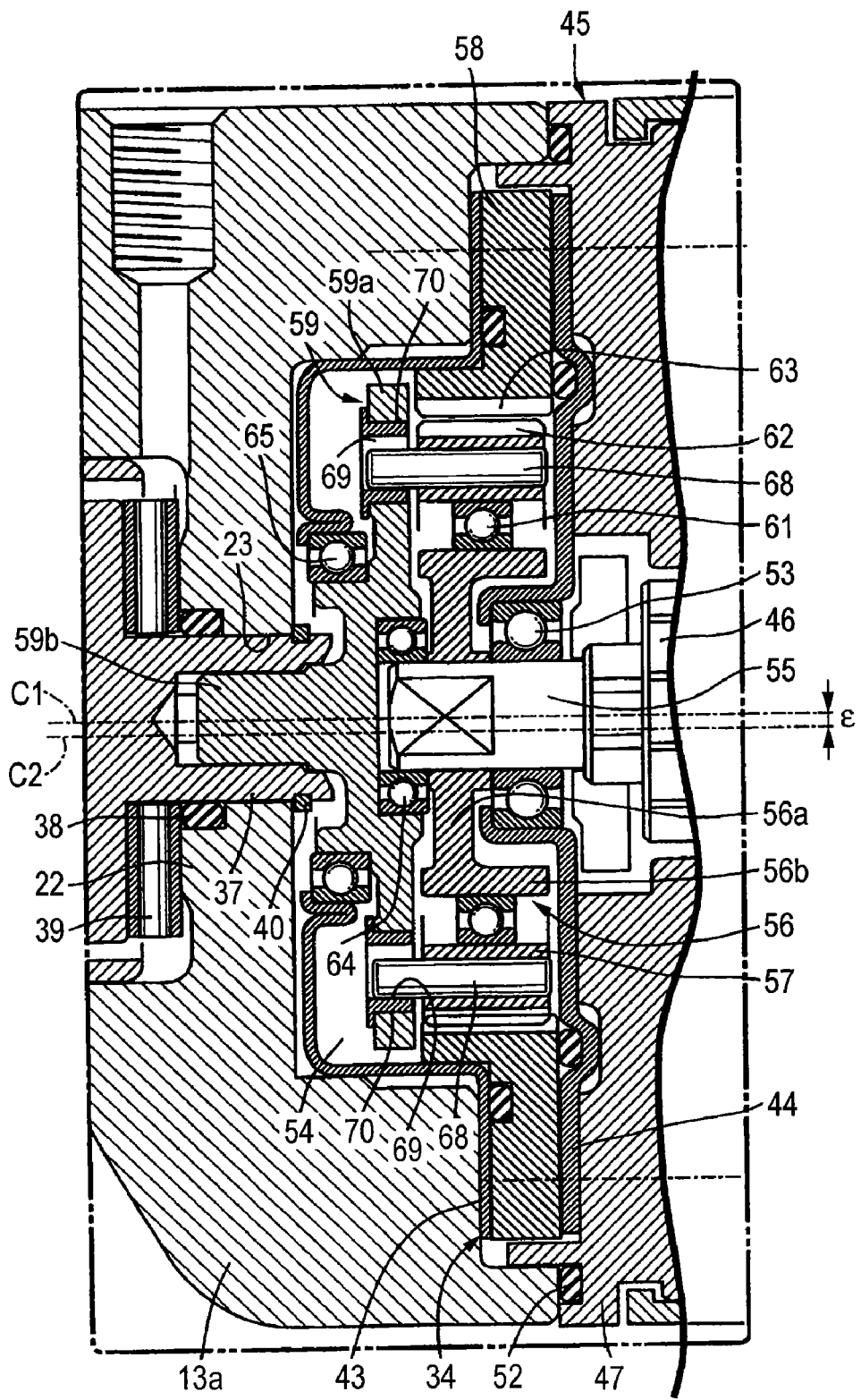
FIG. 4 is an enlarged view of a part viewed in a direction of arrow 4 of FIG. 1.
Figure 5:
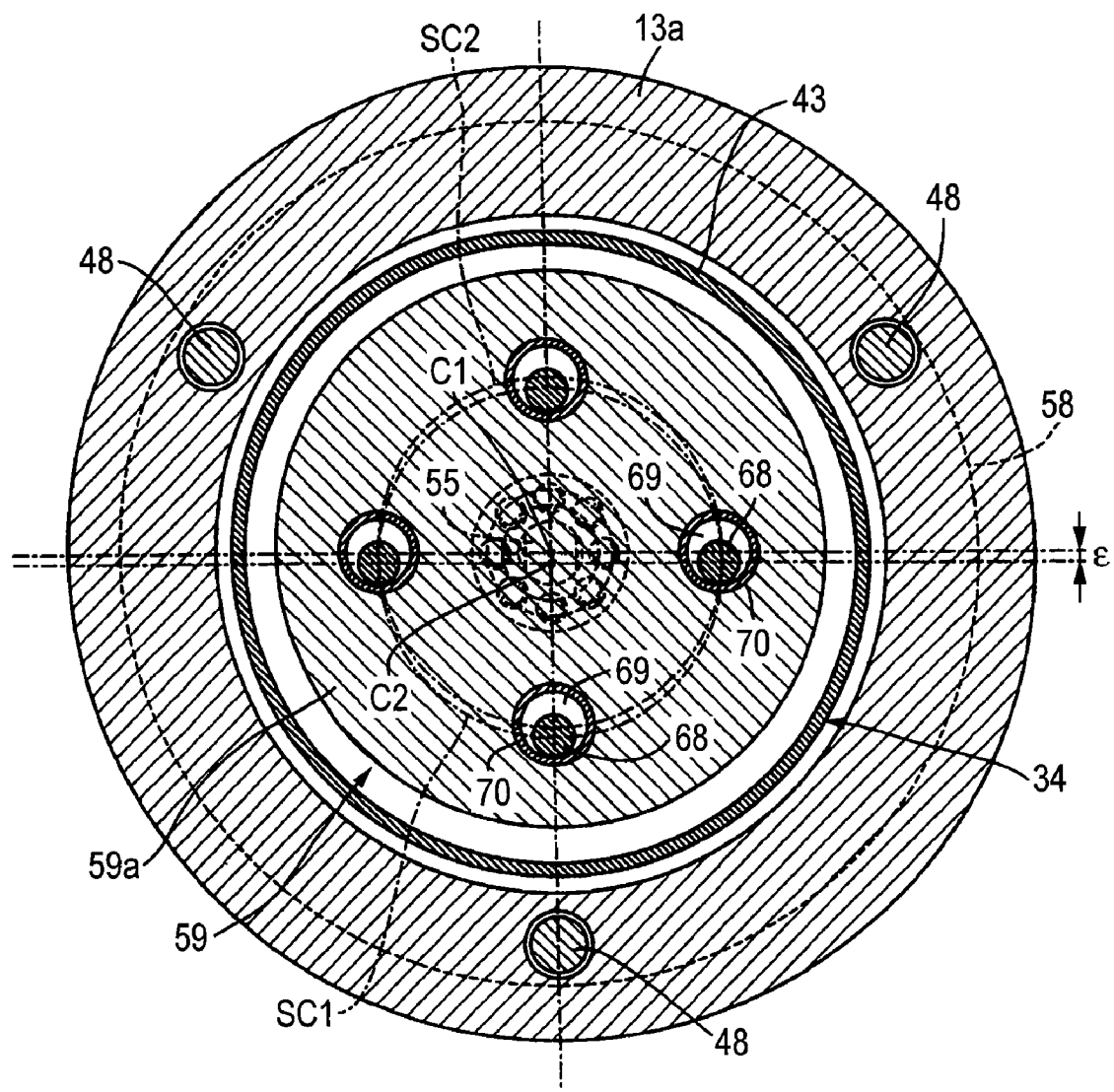
FIG. 5 is a cross-sectional view taken along line 5-5 of FIG. 1.
Figure 6:
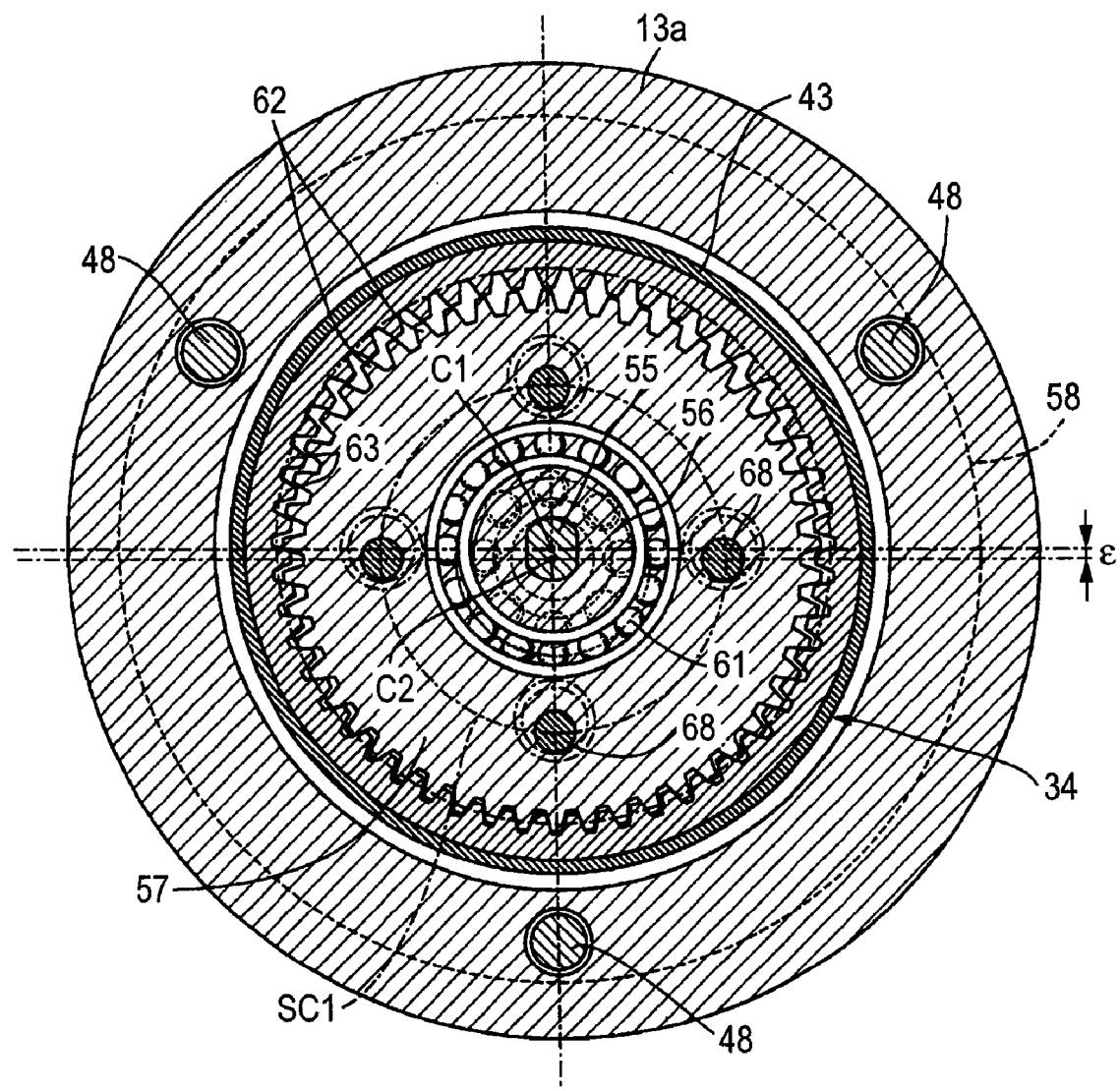
FIG. 6 is a cross-sectional view taken along line 6-6 of FIG. 1.

FIGS. 1 to 6 show an embodiment of the invention, where FIG. 1 is a longitudinal section view of a vehicular disc brake, FIG. 2 is a diagram as viewed in a direction of arrow 2 of FIG. 1, FIG. 3 is a cross-sectional view taken along line 3-3 of FIG. 1, FIG. 4 is an enlarged view of a part viewed in a direction of arrow 4 of FIG. 1, FIG. 5 is a cross-sectional view taken along line 5-5 of FIG. 1, and FIG. 6 is a cross-sectional view taken along line 6-6 of FIG. 1.

First, in FIGS. 1 and 2, the vehicular disc brake makes it possible to obtain a service brake state by a hydraulic pressure and also to obtain a service brake state and a parking brake state by operation of an electric motor 11. The vehicular disc brake includes a disc rotor 12 rotating together with a vehicle wheel (not shown), a caliper body 13 and a pair of friction pads 14 and 15 which are disposed opposite to both side surfaces of the disc rotor 12 and are disposed between the disc rotor 12 and the caliper body 13.

The caliper body 13 has an acting section 13a supported by a bracket 16 attached to a vehicle body so as to be slidable in a direction along the axis line of the disc rotor 12, and a reacting section 13b disposed with the disc rotor 12 interposed between the acting section 13 and the reacting section 13b. The acting section 13a and the reacting section 13b are integrally connected to each other by a bridge portion 13c in which the disc rotor 12 is straddle over.

In the friction pad 14 opposed to one side surface of the disc rotor 12 on the acting section 13a side, a lining 17 which can slide and contact on the disc rotor 12 to provide a frictional force is disposed on a backing plate 18. In the friction pad 15 opposed to the other side surface of the disc rotor 12 on the reacting section 13b side, a lining 19 which can slide and contact on the disc rotor 12 to provide a frictional force is disposed on a backing plate 20. As clearly shown in FIG. 2, ear portions 18a and 18a protruding from both ends in the circumferential direction of the disc rotor 12 are disposed in the backing-plate 18 of the friction pad 14 and the ear portions 18a, 18a are inserted into holding grooves 16a and 16a formed in the bracket 16 so as to be movable in a direction along the axis line of the disc rotor 12. That is, the friction pad 14 is held by the bracket 16 so as to be movable in the direction along the axis line of the disc rotor 12. The friction pad 15 is held by the bracket 16 so as to be movable in the direction along the axis line of the disc rotor 12, with the same holding structure as the friction pad 14.

A cylinder hole 21 which has an axis line parallel to the axis line of the disc rotor 12, which is opened toward the disc rotor 12, and which is closed with an end wall 22 at the opposite side of the disc rotor 12 is formed in the acting section 13a of the caliper body 13 so as to have a circular sectional shape. A through hole 23, which is coaxial with the cylinder hole 21, is formed at the central portion of the end wall 22.

A brake piston 25 forms a brake hydraulic pressure chamber 24 in cooperation with the end wall 22. The brake piston 25 has a closed portion 25a at the front end toward the disc rotor 12 and a bottomed cylinder shape. The brake piston 25 is accommodated in the cylinder hole 21 so as to allow the front closed portion 25a to abut on the backing plate 18 of the friction pad 14 and to slide in the axial direction. The front closed portion 25a of the brake piston 25 engages with the backing plate 18 so as to prevent the rotation in the cylinder hole 21.

An annular piston seal 26 interposed between the caliper body 13 and the brake piston 25 is disposed on the inner surface of the cylinder hole 21. An annular dust boots 27 is disposed between the opening end of the cylinder hole 21 and the brake piston 25. A hydraulic pressure passage 28 guiding a hydraulic pressure to the brake hydraulic pressure chamber 24 is disposed in the acting section 13a.

An output from the electric motor 11, which generates a power for advancing and retreating the friction pads 14, 15 front a disc rotor 12, is transmitted to a brake piston 25 via the speed reducer 32 reducing the output and a screw mechanism 331 which is a motion converting mechanism for converting the rotation of the speed reducer 32 into a axial force of the brake piston 25 for advancing/retreating the friction pads 14, 15. The screw mechanism 33 is accommodated in the cylinder hole 21 of the acting section 13a disposed in the back of the brake piston 25. The electric motor 11 is attached to the acting section 13a of the caliper body 13 from the opposite side of the disc rotor 12. The speed reducer 32 is accommodated in a speed reducer case 34 attached to the acting section 13a.

Referring to FIG. 3, the screw mechanism 33 includes a screw shaft 35 coaxial with the cylinder hole 21 and a nut 36 which engages with the brake piston 25 so as not to be rotatable and is screwed to the screw shaft 35. A transmitting rotation shaft 37 rotatably penetrating the through hole 23 of the end wall 22 so as to transmit the rotation of the electric motor 11 reduced by the speed reducer 32 extends coaxially and integrally from the rear end of the screw shaft 35 opposite to the brake piston 25. An o-ring 38 is interposed between the end wall 22 and the transmitting rotation shaft 37. In the brake hydraulic pressure chamber 24, a flange portion 37a protruding outward in the radius direction is formed integrally with the transmitting rotation shaft 37. A thrust bearing 39 is interposed between the flange portion 37a and the end wall 22. A snap ring 40 abutting on the end wall 22 is mounted on the outer circumference of a portion of the transmitting rotation shaft 37 protruding from the acting section 13a.

The screw shaft 35 is screwed to the nut 36 surrounding the screw shaft 35 in the brake piston 25. The nut 36 has an engaging portion 36a having a rectangular outer circumference at the front end thereof and the front end surface of the engaging portion 36a abuts on the front inner surface of the brake piston 25.

On the other hand, in the inner circumference of the brake piston 25 having a bottomed cylinder shape, locking grooves 42, 42 having an integer times (twice in this embodiment) the tour corners 41, 41 of the engaging portion 36a are disposed at regular intervals in the circumferential direction so as to extend in the axial direction and to selectively engage with the corner portions 41, 41 at a plurality of positions shifted in the circumferential direction. That is, the inner circumference of the brake piston 25 is formed in such a shape that a plurality of regular polygons shifted in phase are overlapped to correspond to the circumferential shape of the engaging portion 36a. In this embodiment, the inner circumference of the brake piston has a star-like shape obtained by overlapping two squares shifted by 45 degrees in phase.

Accordingly, with such a simple structure that the corner portions 41, 41 of the engaging portion 36a formed in the nut 36 so as to have an outer circumference of a regular polygon shape are allowed to engage with the locking grooves 42, 42 in the inner circumference of the non-rotatable brake piston 25, the nut 36 is made to be not rotatable. In addition, since the locking grooves 42, 42 having an integer times the number of corner portions 41, 41 of the engaging portion 36a are formed in the inner circumference of the brake piston 25, it is easy to position the engaging portion 36a with the brake piston 25 and thus to enhance the assembling workability. It is also possible to enhance an air exhausting property owing to the locking grooves 42, 42 not engaging with the engaging portion 36a.

In the screw mechanism 33, when the power from the electric motor 11 is reduced by the speed reducer 32 and the power rotating in one direction is supplied to the screw shaft 35 through the transmitting rotation shaft 37, the disc rotor 12 is pressed between both friction pads 14 and 15 by means of the action and reaction resulting from the sliding of the brake piston 25 forward in the axial direction in the state where the brake piston 25 and the nut 36 are prevented from relatively rotating, thereby obtaining a braking force. By allowing the screw shaft 35 to rotate in the opposite direction, the brake piston 25 slides backward in the axial direction, thereby releasing the braking state.

Referring to FIG. 1 again, the speed reducer case 34 includes a pair of case members 43 and 44 and an inner gear 58 which constitutes a part of the speed reducer 32 and of which outer circumference is interposed between both case members 43 and 44. (That is, the inner gear 58 is fixed within the case members 43, 44 the speed reducer side and does not rotate relative to the speed reducer.) The speed reducer case 34 is fastened to the acting section 13a of the caliper body 13 along with a motor case 45 of the electric motor 11.

A part of the motor case 45 constitutes a brush bolder 47 which holds a brush (not shown) slidably contacting a commutator 46 disposed on the motor shaft 55 of the electric motor 11. The speed reducer case 34 is interposed between the acting section 13a of the caliper body 13 and the brush holder 47. The motor case 45 and the speed reducer case 34 are fastened to the acting section 13a by means of simultaneous lock with a plurality of bolts 48, 48 (see FIGS. 2, 5 and 6). A motor cover 49 covering the motor case 45 is detachably attached to the motor case 45.

An annular seal member 50 coming in elastic contact with the case member 43 is mounted on one surface of the inner gear 58 and an annular seal member 51 coming in elastic contact with the other surface of the inner gear 58 is mounted on the case member 44. An annular seal member 52 surrounding the speed reducer case 34 is mounted on the brush holder 47 of the motor case 45 so as to come in elastic contact with the acting section 13a of the caliper body 13.

In the state where the motor case 45 is fastened to the acting section 13a, the motor shaft 55 of the electric motor 11 is disposed so as to be coaxial with the rotation center line of the screw mechanism 33, that is, the axis line of the transmitting rotation shaft 37. A ball bearing 53 is interposed between the case member 44 and the motor shaft 55.

The speed reducer case 34 forms a speed reducer chamber 54 isolated from the brake hydraulic pressure chamber 24 in the acting section 13a of the caliper body 13 by the end wall 22 and the speed reducer 32 is accommodated in the speed reducer chamber 54.

Referring to FIGS. 4 to 6, the speed reducer 32 includes an eccentric rotating member 56 which has an outer circumference eccentric with a motor shaft 55 of the electric motor 11 and rotates together with the motor shaft 55. An outer gear 57 which is coaxial with the eccentric rotating member 56 and is rotatably supported by the outer circumference of the eccentric rotating member 56. An inner gear 58 which is fixed to the speed reducer case 34, an output member 59 which is disposed so as to be coaxial with the motor shaft 55 and is connected to the screw mechanism 33 through an electric rotating shaft 37, and an Oldham mechanism 60 which is disposed between the outer gear 57 and the output member 59 so as to transmit only a rotational component of the outer gear 57.

The eccentric rotating member 56 includes a disc portion 56a to which the motor shaft 55 is inserted and a cylinder portion 56b extending perpendicularly and integrally from the outer circumference of the disc portion 56a toward the electric motor 11. On the other hand, in a location corresponding to the eccentric rotating member 56, the outer circumference of the motor shaft 55 is formed in a shape having a non-circular section. By inserting the motor shaft 55 into and through the disc portion 56a, the eccentric rotating member 56 is connected to the motor shaft 55 so as to be relatively non-rotatable. The motor shaft 55 is non-rotatably inserted into and allowed to penetrate through the disc portion 56a so as to locate the center C2 of the disc portion 56a at a position departing from the axis line C1 of the motor shaft 55 by an amount of eccentricity $\epsilon$. The outer circumference of the eccentric rotating member 56 is eccentric with the motor shaft 55 by the amount of eccentricity $\epsilon$.

The outer gear 57 is pivotally supported by the eccentric rotating member 56 through the ball bearing 61 interposed between the outer circumference of the eccentric rotating member 56 and the outer gear. A plurality of outer teeth 62, 62 are disposed on the outer circumference of the outer gear 57. The inner gear 58 is fixed to the speed reducer case 34 and inner teeth 63, 63, of the number larger than the number of outer teeth 62, 62 are disposed in the inner circumference of the inner gear 58 so as to engage with the outer teeth 62, 62. The number of inner teeth 63, 63 is set to be larger than the number of outer teeth 62, 62, for example, by 1.

The output member 59 integrally has a disc portion 59a opposed to the outer gear 57 on the opposite side of the electric motor 11 and a connecting shaft portion 59b protruding from the center of the disc portion 59a to the opposite side of the electric motor 11. The connecting shaft portion 59b is coaxially and non-rotatably locked to the electrical rotating member 37. In addition, a ball bearing 64 is interposed between the motor shaft 55 and the output member 59 and a ball bearing 65 is interposed between the case member 43 and the output member 59 in the speed reducer case 34.

The Oldham mechanism 60 includes a plurality of pins, for example, four pins, 68, which are fitted and fixed to the outer gear 57 at regular intervals in the circumferential direction on a first virtual circle SC1 of which center is the axis line of the outer gear 57 and a plurality of connection holes 69, which are disposed in the disc portion 59a of the output member 59 at regular intervals in the circumferential direction on a second virtual circle SC2 of which center is the axis line of the motor shaft 55, which has a diameter larger than the diameter of the pins 68, and which allows the pins 68, to penetrate through and to engage with eccentric positions, respectively.

Next, operations of this embodiment will be described. The speed reducer 32 for reducing the rotation of the electric motor 11 includes the eccentric rotating member 56 which has a circumference coaxial with the axis line of the motor shaft 55 of the electric motor 11 and rotates together with the motor shaft 55, the outer gear 57 which is coaxial with the eccentric rotating member 56 and is rotatable supported by the outer circumference of the eccentric rotating member 56, and in which a plurality of outer teeth 62, are formed on the outer circumference thereof, the inner gear 58 in which inner teeth 63 having the number larger than the number of outer teeth 62 are formed on the inner circumference thereof so as to engage with the outer teeth 62, and which is fixedly disposed so as to be coaxial with the motor shaft 55, the output member 59 which is disposed so as to be coaxial with the motor shaft 55 and is connected to the screw mechanism 33, and the Oldham mechanism 60 which is disposed between the outer gear 57 and the output member 59 so as to transmit only a rotational component of the outer gear 57. The inner gear 58 is fixed to the speed reducer case 34 which is disposed in the caliper body 13 so as to house the speed reducer 32.

According to the speed reducer 32, the outer gear 57 rotates at a reduction ratio corresponding to a difference between the number of inner teeth 63, of the inner gear 58 and the number of outer teeth 62, of the outer gear 57 with the rotation of the eccentric rotating member 56 resulting form the driving of the electric motor 11 and the rotational component of the outer gear 57 is input to the screw mechanism 33 through the Oldham mechanism 60, thereby driving the brake piston 25 in the axial direction. Since the inner gear 58 of the speed reducer 32 is fixedly disposed and it is not necessary to secure a space for a ball bearing outside the inner gear 58 in the radius direction, it is possible to compact the speed reducer 32.

The Oldham mechanism 60 includes a plurality of pins 68, which are disposed in the outer gear 57 at regular intervals in the circumferential direction on the first virtual circle SC1 of which center is the axis line of the outer gear 57 and a plurality of connection holes 69, which are disposed in the output member 59 at regular intervals in the circumferential direction on the second virtual circle SC2 of which center is the axis line of the motor shaft 55, which has a diameter larger than the diameter of the pins 68, and which allows the pins 68 to penetrate through and to engage with eccentric positions, respectively. As a result, it is possible to simplify the configuration of the Oldham mechanism 60, enhance the assembling workability, and to prevent a wobbling of a shaft.

Although an embodiment of the invention has been described, the invention is not limited to the embodiment, but may be modified in various designs without departing from the scope of the invention described in the appended claims.

What is claimed is:

1. A vehicular disc brake comprising a caliper body supporting a brake piston so as to be slidable in an axial direction of the brake piston, the caliper body comprising:
   an electric motor having a motor shaft;
   a speed reducer that reduces output from the electric motor and has a case;
   a motion converting mechanism that converts a rotation output from the speed reducer into axial operation force of the brake piston, is interposed between the brake piston and the speed reducer and has an input member disposed so as to be coaxial with the motor shaft,
   wherein the speed reducer comprises:
      an eccentric rotating member which has an outer circumference being eccentric with an axis line of the motor shaft and rotates together with the motor shaft;
      an outer gear which is coaxial with the eccentric rotating member and is rotatably supported by the outer circumference of the eccentric rotating member, and provided with outer teeth on an outer circumference thereof;
      an inner gear that is provided with inner teeth, of which number is larger than that of the outer teeth, on an inner circumference thereof so as to engage with the outer teeth and is fixedly disposed to the case of the speed reducer so as to be coaxial with the motor shaft so as not to rotate relative to the speed reducer;
      an output member which is connected to the input member of the motion converting mechanism so as to be not relatively rotatable about the input member; and
      an Oldham mechanism which is disposed between the outer gear and the output member so as to transmit only a rotational component of the outer gear.

2. The vehicular disc brake according to claim 1, wherein the Oldham mechanism comprises:
   a plurality of pins which are disposed in the outer gear at regular intervals in a circumferential direction of a first virtual circle (SC1) of which center is an axis line of the outer gear; and
   a plurality of connection holes which are disposed in the output member at regular intervals in a circumferential direction of a second virtual circle (SC2) of which center is an axis line of the motor shaft,
   wherein the connection hole has a diameter larger than diameter of the pins, and allows the pins to penetrate therethrough to locate the pins in eccentric positions relative to the connection holes, respectively.

3. The vehicular disc brake according to claim 1, wherein the motion converting mechanism is a screw mechanism accommodated in a cylinder hole of an acting section disposed in a back of a brake piston.

4. The vehicular disc brake according to claim 3, wherein the screw mechanism includes a screw shaft coaxial with the cylinder hole and a nut which engages with the brake piston so as not to be rotatable, and wherein the nut is screwed to the screw shaft.

5. The vehicular disc brake according to claim 4 wherein the input member is a transmitting rotation shaft extending coaxially and integrally from a rear end of the screw shaft opposite to the brake piston.

6. The vehicular disc brake according to claim 4, wherein the screw shaft is screwed to the nut and the nut has an engaging portion abutting on a front inner surface of the brake piston.

7. The vehicular disc brake according to claim 1, wherein the case of the speed reducer includes a pair of case members, wherein the inner gear is fixed between the case members so as not to rotate relative to the speed reducer.

8. The vehicular disc brake according to claim 1, wherein the case of the speed reducer is fastened to an acting section of a caliper body along with a motor case of the electric motor.

9. The vehicular disc brake according to claim 8, wherein a part of the motor case constitutes a brush holder and the case of the speed reducer is interposed between the acting section of the caliper body and the brush holder.

10. The vehicular disc brake according to claim 1, further comprising:
    an annular seal member coming in elastic contact with one of the case members and mounted on one surface of the inner gear;
    an annular seal member coming in elastic contact with the other surface of the inner gear and mounted on another of the case members; and
    an annular seal member surrounding the case of the speed reducer and mounted on a brush holder of a motor case so as to come in elastic contact with an acting section of the caliper body.

11. The vehicular disc brake according to claim 1, wherein the eccentric rotating member includes a disc portion to which the motor shaft is inserted and a cylinder portion extending perpendicularly and integrally from the outer circumference of the disc portion toward the electric motor.

12. The vehicular disc brake according to claim 11, wherein an outer circumference of the motor shaft is formed in a shape having a non-circular section, and the motor shaft is inserted into and through the disc portion, such that the eccentric rotating member is connected to the motor shaft in a relatively non-rotatable manner.

13. The vehicular disc brake according to claim 12, wherein the motor shaft is non-rotatably inserted into and penetrates through the disc portion so as to locate a center (C2) of the disc portion at a position departing from an axis line (C1) of the motor shaft by an amount of eccentricity $\epsilon$.

14. The vehicular disc brake according to claim 1, wherein the outer gear is pivotally supported by the eccentric rotating member through a ball bearing interposed between the outer circumference of the eccentric rotating member and the outer gear.

15. The vehicular disc brake according to claim 1, wherein the output member having has an integrally formed disc portion opposed to the outer gear on an opposite side of the electric motor, and a connecting shaft portion protruding from the center of the disc portion to the opposite side of the electric motor, the connecting shaft portion being coaxially and non-rotatably locked to a transmitting rotating member.

16. The vehicular disc brake according to claim 1, further comprising a ball bearing interposed between the case of the speed reducer and the motor shaft.

* * * * *